United States Patent [19]

Surinak

[11] Patent Number: 5,746,273
[45] Date of Patent: May 5, 1998

[54] PITLESS WELL ADAPTER

[76] Inventor: John J. Surinak, 2 Earling Ct., Oconomowoc, Wis. 53066

[21] Appl. No.: 647,224

[22] Filed: May 9, 1996

[51] Int. Cl.[6] .................................................. E21B 33/00
[52] U.S. Cl. ........................ 166/85.2; 285/106; 285/918
[58] Field of Search .............................. 166/83.2, 88.4, 166/241.6; 285/106, 918

[56] References Cited

U.S. PATENT DOCUMENTS

| | | |
|---|---|---|
| 2,689,611 | 9/1954 | Martinson . |
| 3,467,181 | 9/1969 | Maass . |
| 3,645,333 | 2/1972 | Maass . |
| 3,976,131 | 8/1976 | Woodford et al. ............ 166/85.2 |
| 4,042,020 | 8/1977 | Wellstein ........................ 166/85.2 |
| 4,056,144 | 11/1977 | Wellstein ........................ 166/85.2 |
| 4,886,426 | 12/1989 | Surinak . |

*Primary Examiner*—Roger J. Schoeppel
*Attorney, Agent, or Firm*—Andrus, Sceales, Starke & Sawall

[57] ABSTRACT

In a pitless well adapter, an adapter insert from which a flow pipe and pump depends, is normally vertically, slidably and removably held by wedge ribs in an adapter housing. The top surfaces of the adapter insert and adapter housing are similarly formed such that sliding the adapter insert out of engagement with the adapter housing will enable the adapter insert to be deflected into the casing in a manner which will spare damage to the adapter insert. The bottom surface of the adapter insert and the adapter housing are of matching contours so as to permit proper seating of the adapter insert in the adapter housing. The uppermost portion of the wedge ribs are tapered to form a guide surface engageable with the adapter insert upon installation of the adapter insert in the adapter housing.

7 Claims, 2 Drawing Sheets

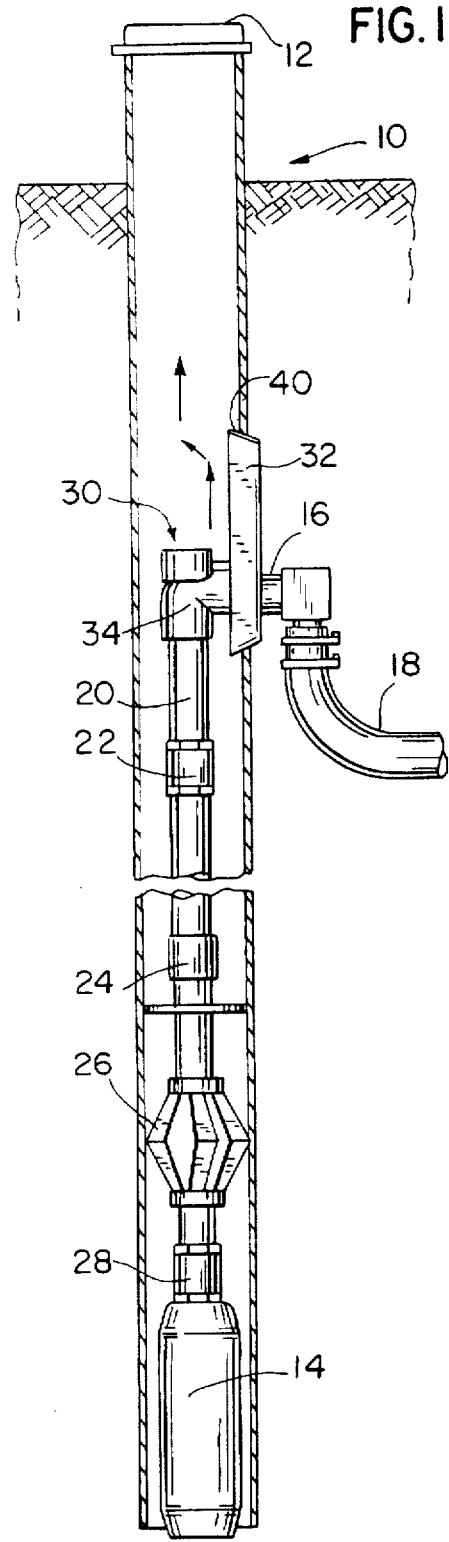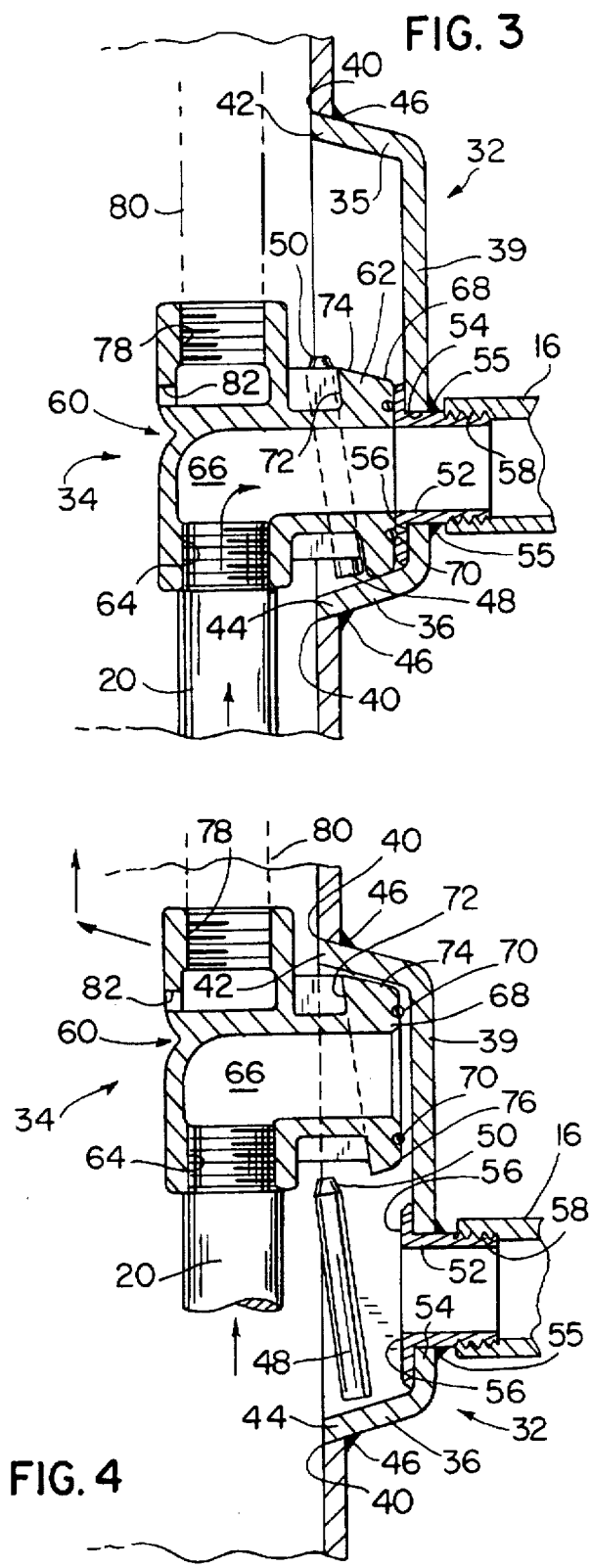

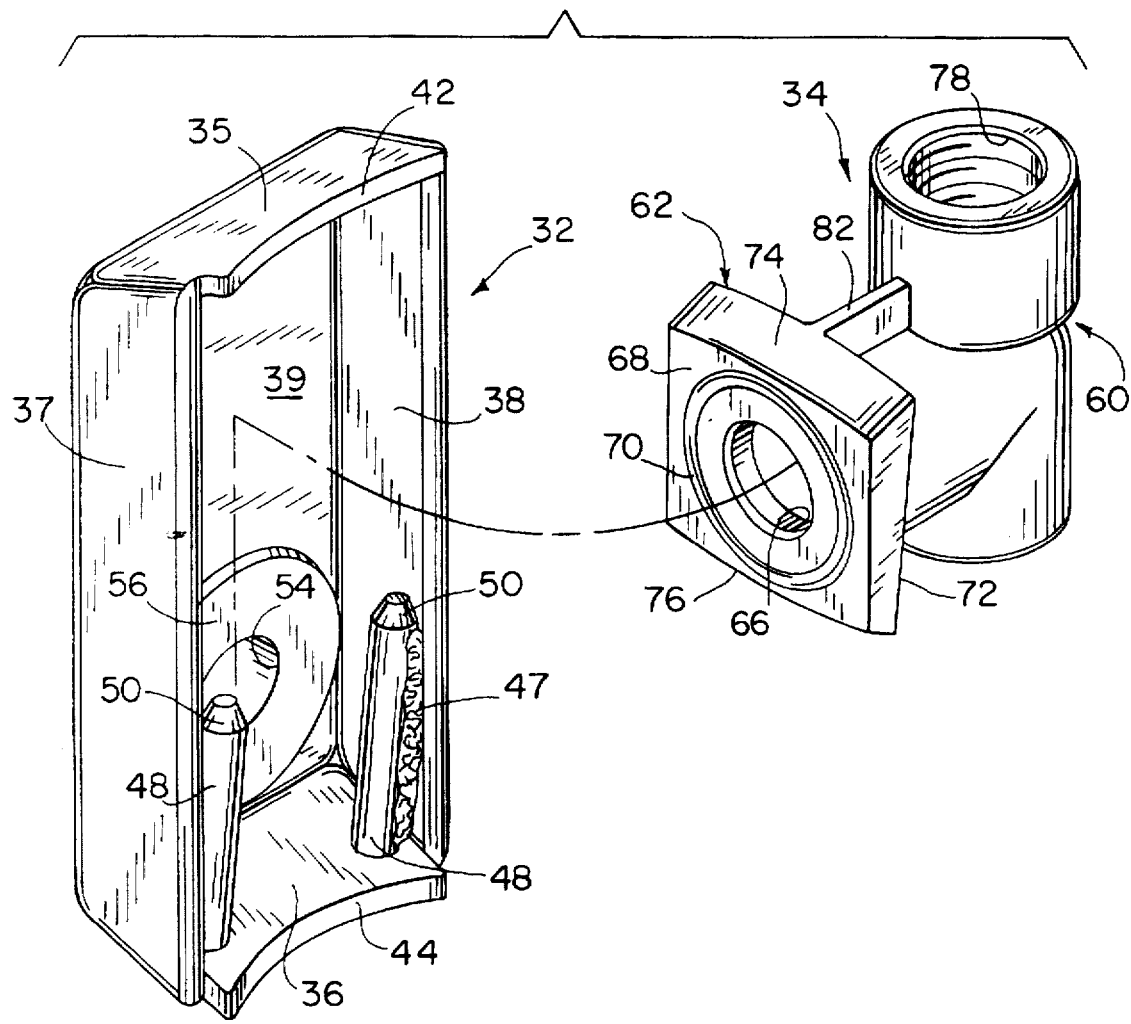

PITLESS WELL ADAPTER

FIELD OF THE INVENTION

The present invention relates broadly to pumping systems for sanitary water wells and, more particularly, pertains to a pitless well adapter mounted in the well casing for connecting the flow pipe of a submergible pump with a water supply pipe leading from the well casing.

BACKGROUND OF THE INVENTION

In applicant's previous U.S. Pat. No. 3,467,181, a brass adapter insert having an apertured wedge block is normally held in fluid type connection by means of wedge ribs provided within a steel adapter housing fixed within an opening in the well casing. An upward pull on the adapter insert will bring it into such position within the well casing that it and it's dependent flow pipe and pump may be lifted out of the well casing for inspection or repairs.

Water wells equipped with a pitless well adapter of the type described above are customarily chlorinated by removing the well cap at the top of the well and pouring chlorine down the well and into the water. If not properly done, the chlorine in liquid or dry form is spilled and begins to corrode the pitless well adapter. In some cases, the adapter insert becomes fused to the adapter housing making removal difficult. In the course of such removal efforts, large pulling forces are exerted on the adapter insert which sometimes snaps loose and travels upwardly, catching the top surface of the wedge block on the top wall of the adapter housing, thereby shearing the wedge block off. In the event the adapter insert and its depending pump are successfully extracted from the well for servicing, reinstallation of the adapter insert may be hindered by alignment of the bottom of the wedge block with the top portion of the wedge ribs. Once the adapter insert has been guided between the wedge ribs, proper seating and registration of the apertured wedge block with the water supply pipe may be affected by an accumulation of foreign matter behind the wedge ribs along the bottom wall of the adapter housing. Further problems may be experienced if the wedge ribs are constructed of carbon steel, which are subject to corrosion and promote unwanted fusion of the brass adapter insert.

Accordingly, it is desirable to provide a pitless well adapter constructed and arranged so that an adapter insert may be shifted upwardly free of its wedging engagement with the adapter housing in a manner which will prevent damage between the adapter insert and the adapter housing. It is also desirable to provide an arrangement to aid the guiding of the adapter insert into and out of its position with the wedge ribs on the adapter housing. It is further desirable to provide an adapter insert which will seat fully within the adapter housing in a manner which will reduce the accumulation of foreign matter and improve the separability of the adapter insert from the adapter housing. Moreover, it remains desirable to protect the interface between the adapter insert and the adapter housing during installation or removal procedures.

SUMMARY OF THE INVENTION

The present invention advantageously provides a pitless well adapter wherein critical surfaces of the adapter insert and adapter housing are specifically shaped and constructed to facilitate improved installation and removal of the adapter insert relative to the adapter housing.

In one aspect of the invention, a well casing has an underground hollow section with an opening in its wall, and an adapter housing is secured to the section in registration with the opening and includes a top wall, a bottom wall, a pair of sidewalls, an outer wall having an inner face in communication with a supply pipe, and a wedge rib on each of the side walls. An adapter insert is removably mounted on the adapter housing and includes a tapered wedge block having a top surface, a bottom surface, an inner surface and an outer surface in communication with the supply pipe, the wedge block being wedgingly installed between the wedge ribs and the inner face. The adapter insert also includes an upwardly projecting socket for receiving a drop pipe to permit installation and removal of the adapter insert, and a downwardly depending leg for receiving a flow pipe and a pump. The improvement resides in the top wall of the adapter housing and the top surface of the adapter insert being inclined at the same angle to prevent shearing of the wedge block against the top wall of the adapter housing when the adapter insert is removed from the adapter housing. The bottom wall of the adapter housing and the bottom surface of the adapter insert are inclined at the same angle to enable proper seating of the adapter insert relative to the adapter housing and prevent accumulation of foreign matter rearwardly of the wedge ribs adjacent the bottom wall of the adapter housing.

In another aspect of the invention, a pitless well adapter used in a well casing having an underground section formed with an opening in its wall and equipped with a pump, comprises an adapter housing secured to the underground section in registration with the opening. The adapter housing includes a top wall, a bottom wall, a pair of sidewalls, an outer wall having an inner face in communication with a supply pipe, and a wedge rib formed on each of the side walls. An adapter insert is slidably and removably mounted in the adapter housing in communication with the supply pipe. The adapter insert includes a wedge block having a top surface, a bottom surface, an inner surface, and an outer surface, the wedge block being wedgingly inserted between the wedge ribs and the inner face of the adapter housing. The adapter insert further includes a coupling member joined to the wedge block for receiving a drop pipe to permit installation and removal of the adapter insert, a flow pipe and a pump. The top wall of the adapter housing and the top surface of the wedge block are formed of matching slopes, such that sliding the wedge block out of the wedge ribs will enable the adapter insert to deflect away from the adapter housing into the well casing. The bottom wall of the adapter housing and the bottom surface of the wedge block are formed of matching slopes such that the sliding of the wedge block into the wedge ribs will terminate as the bottom wall is engaged by the bottom surface. The uppermost portion of the wedge ribs are chamfered to form a guide surface engageable with the inner surface of the wedge block as the adapter insert is slidable into position in the adapter housing.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side view in elevation of a well installation of the pitless and submergible pump type including an improved pitless well adapter embodying the present invention;

FIG. 2 is an exploded perspective view of the adapter housing and adapter insert forming the pitless well adapter;

FIG. 3 is an enlarged, fragmentary sectional view of the pitless well adapter showing the adapter insert in an operative position coupled with the adapter housing; and FIG. 4 is an enlarged, fragmentary sectional view of the pitless well adapter showing the adapter insert in a raised position in the process of being uncoupled from the adapter housing.

DETAILED DESCRIPTION OF THE ILLUSTRATED EMBODIMENT

Referring now to FIG. 1, the well casing of a sanitary well, which may be of generally circular or rectangular form in cross-section, is indicated by the reference numeral 10, and protrudes above the ground level a required distance. The upper end of well casing is provided with a sealing cap 12 removably secured thereto to prevent the ingress of foreign matter. Water is discharged by means of a submergible pump 14 from the interior of well casing 10 via a supply pipe 16 passing perpendicularly therethrough. Water from supply pipe 16 is channeled into a delivery pipe 18 connected to a pressure tank (not shown). Pump 14 is provided with an intake through which water is drawn, and a flow pipe 20 through which water is pumped to supply pipe 16. Serially interposed between flow pipe 20 and submergible pump 14 is an upper check valve 22, a coupling 24, a torque arrester 26 and a lower check valve 28, all of which are conventional accessories used in sanitary well applications. The opening of flow pipe 20 of pump 14 is coupled to the inlet opening of supply pipe 16 by means of a pitless well adapter 30 of the type generally described in applicant's prior U.S. Pat. No. 3,467,181 and comprised of an adaptor housing 32 and an adaptor insert 34.

Referring now to FIGS. 2–4, adapter housing 32 is a box of generally rectangular form with slightly inclined upper and lower end walls 35, 36, a pair of side walls 37, 38 and an outer wall 39. The well casing 10 is provided with a rectangular opening 40 in a portion of its wall to which adapter housing 32 is applied in the manner shown in the drawings to close the rectangular opening 40 in well casing 10 and to project outwardly laterally therefrom. The extremities of the end walls 35, 36 of adapter housing 32 are formed as lips 42, 44 radiused so as to fit within the upper and lower margins of the well casing wall opening 40. As arranged, inclined walls 35, 36 eliminate any interior ledges or the like which might prevent the undesirable collection of water, foreign matter, or rust formation within casing 10. Adapter housing 32 is secured to the casing section in waterproof relation to the opening 40 therein by means of welding as indicated at 46. Welded at 47 (FIG. 2) to interior, lower side walls 37, 38 of adapter housing 32 are a pair of laterally spaced apart wedge ribs 48, preferably comprised of stainless steel, which are inclined downwardly and outwardly at about 8° relative to the vertical axis of well casing 10. The location of wedge ribs 48 is such that after adapter housing 32 is installed on the casing section, ribs 48 do not project into casing 10 so as to form obstructions therein. In accordance with one feature of the invention, the uppermost portion 50 of wedge ribs 48 are upwardly tapered or chamfered and frusto-conically shaped to define guide surfaces for adapter insert 34, as will be appreciated hereafter.

The stem portion of a pipe connector 52 extends through and tightly closes a circular opening 54 therefor in a lower portion of outer vertical wall 39 of adapter housing 32, the connector 52 being welded in place as shown at 55 in FIGS. 3 and 4. The inner end of pipe connector 52 is formed as an enlarged circular flange or plate 56 which lodges tightly against an inner surface portion of outer wall 39 of adapter housing 32 surrounding the circular opening 54 therein. The exposed flat face of the plate 56 of pipe connector 52 provides one of the complimentary elements of a slip pressure joint. Stem portion of pipe connector 52 extends outwardly of the outer face of adaptor housing 32 at a slight distance, and is externally threaded to receive the threaded portion 58 of the horizontally directed supply pipe 16 which extends away from well casing 10 to wherever the pumped water is to be utilized.

Adapter insert 34 is illustrated as a unitary combination T-coupling 60 and pressure slip joint wedge block 62. The unitary member 34 is typically a bronze casting and in its preferred form is shown as being for a single pipe arrangement, although it can be double. As shown, the head end of T-coupling 60 has a depending vertical internally-threaded portion 64 adapted to have threaded thereinto the upper portion of flow pipe 20 which extends downwardly into the lower portion of well casing 10 to let water force upwardly therein when the well pump is in operation. A main chamber 66 within T-coupling 60 of casting 34 has its axis at right angles to the axis of flow pipe 20 and is continued through the laterally-extending pressure joint wedge block 62, which is an integral part of unitary casting 34. The outer flat face 68 of pressure joint wedge block 62 surrounding the outer end of chamber 66 is formed as a complimentary pressure joint surface to wedge tightly against the adjacent face of plate 56 of pipe connector 52. Fluid-type sealing is enhanced by an annular gasket or 0-ring 70 within a recess within face 68. It will be observed from FIGS. 3 and 4, that an inner face 72 of wedge block 62 is downwardly, outwardly tapered at an angle of about 8° to conform to the inclination of wedge ribs 48 which engage inner face 72 when unitary casting 34 is at its operative position shown in FIGS. 1 and 3. When unitary casting 34 is so positioned within well casing 10 and the pump is in operation, the flow of water will be as indicated by the arrows in FIG. 3, water passing from the upper end of flow pipe 20 through chamber 66 in unitary bronze casting 34, and through the registering openings in pipe connector 52 and wedge block 62 into water supply pipe 16. This entire passageway is devoid of obstructions.

In accordance with another feature of the invention, wedge block 62 has an upper surface 74 which is inclined in the direction from outer face 68 to inner face 72 at the same angle of inclination of upper end wall 35 of adapter housing 32. Wedge block 62 also has a lower surface 76 inclined in the direction from inner face 72 to outer face 68 at the same angle of inclination of lower end wall 36 of adapter housing 32. As will be understood more fully, matching the angular orientation of the wedge block upper and lower surfaces 74, 76 with respect to upper and lower end walls 35, 36 facilitates removal and installation of adapter insert 34 within adapter housing 32.

Upper end portion of unitary bronze casting 34 is provided with an internally-threaded socket 78 into which the lower end portion of a drop pipe 80 (see FIG. 3) may be temporarily threaded when the installation is made, or when parts are to be removed from the well casing 10 for repairs and inspections. It should be noted, however, that socket portion 78 is not in communication with flow pipe 20 or chamber 66 in bronze casting 34, but is formed with a drain opening or port 82.

In installing the improved pitless well adapter, after well casing 10 is sunk into the ground in the usual manner with adapter housing 32 welded within the opening 40 formed in the well section either before or after sinking the well casing 10 and with pipe connector 52 secured within opening 54 in adapter housing 32, supply pipe 16 is connected to pipe connector 52 and is directed horizontally therefrom to the desired point of use. Well casing 10 is then ready to receive the pump 14, motor or other equipment. Unitary bronze casting 34 removed from the well casing 10 has threaded into its dependent portion 64 the upper end of flow pipe 20 and bronze casting 34 carrying flow pipe 20 and the motor and its pump 14, is lowered into the well casing 10 through the upper end thereof when sealing cap 12 is removed. This is accomplished by temporarily applying to socket portion 78 of casting 34 the drop pipe 80. During the lowering operation, when bronze casting 34 reaches the open side of the upper portion of the adapter housing 32, casting 34 is oriented so that integral wedge block 62 thereof will enter adapter housing 32 and will be lowered therein until tapered inner face 72 of wedge block 62 engages the uppermost tapered portions 50 of wedge ribs 48 which are mounted fast on opposite sides 37, 38 of the lower interior portion of adapter housing 32. Uppermost tapered surfaces 50 of wedge ribs 48 thus function to initially guide wedge block 62 between wedge ribs 48 wherein wedge block 62 assumes a gradual wedge fit in adapter housing 32 when lower inclined surface 76 is fully seated against the lower end wall 36 (FIG. 3). Such construction is advantageous in preventing the buildup of foreign matter behind wedge ribs 48 as has occurred in prior art. The inclination of wedge ribs 48 acting on the correspondingly inclined face 72 of wedge block 62 will, when casting 34 reaches its ultimate position, cause the complimentary pressure joint face to impinge tightly against the complimentary pressure joint face of pipe connector 52, with the outer end of casting chamber 66 in direct registration with the entrance into supply pipe 16. The sealing effect accomplished from the complimentary wedging members creates, with the 0-ring 70, a watertight connection and the weight of all the dependent parts is borne by the wedging elements and creates no strain on any of the fittings.

When the pitless well adapter is installed as described, and when the pump and well are operative, temporary drop pipe 80 is removed and sealing cap 12 is in place, as in FIG. 1. When it is desired to remove the equipment associated with the lower end portion of flow pipe 20 for inspection repair or replacement, well cap 12 is removed to permit drop pipe 80 to be inserted as shown in broken lines in FIGS. 3 and 4 and engaged with the socket portion 78 of casting 34. By an upward pull on drop pipe 80, casting 34 will be raised, as shown in FIG. 4, so that the wedging surface of casting 34 will move upwardly free of the wedge ribs 48 and cause a sliding disengagement of the pressure joint elements which include face 68 of wedge block 62 and circular flange 56 of pipe connector 52. At this point in the prior art, the upward pull would cause the flat upper surface of wedge block 62 to strike the upper end wall 35 of adapter housing 32, thereby shearing off wedge block 62 or otherwise damaging the pipes carried in well casing 10. However, with the present invention, the matching angular orientation of upper surface 74 and upper end wall 35 ensures that wedge block 62 will deflect, or be kicked away, from adapter housing 32 for unimpeded vertical movement upwardly within the walls of well casing 10. It should also be realized that within adapter housing 32 and between side walls 37, 38 thereof, and outer wall 39 above its ribs 48, the meeting portions of walls are rounded along a radius which is important in installation or removal in that the wall radii will hold the pressure joint face 68 of wedge block 62 away from the inner surface 56 of the adjacent wall in adapter housing 32 and thereby prevent any damage to the sealing face of the wedge block 62 and its 0-ring 70. From the drawing, it will also be observed that unitary casting 34 is formed with an inclined upwardly projecting web 82 between socket portion 78 and wedge block 62. This web 82 prevents casting 34 from striking or hooking on any portion of the assemblage during its movement into and out of its operative position. The removal from well casing 10 of adapter insert 34 and parts dependent therefrom can generally be accomplished for servicing purposes without any digging around the well casing 10 or removal of parts from the latter.

Besides providing pocketless inclined surfaces to eliminate the collection of condensation and foreign material, the present adapter housing 32 and adapter insert 34 are of a construction which greatly simplifies installation and removal problems. The recommended use of stainless steel material for constructing wedge ribs 48 serves to prevent fusion of brass casting 34 to wedge ribs 48 and also helps eliminate corrosion of the wedge ribs 48 which support brass casting 34, pipe 20 and pump 14 in place. It should be understood that the inclination of upper surfaces 35, 74 on both adapter housing 32 and the adapter insert 34 prevents catching of the adapter insert 34 on the upper portion of adapter housing 32 if adapter insert 34 is stuck or fused and a large upward force is necessary to release it. Likewise, it should also be understood that the inclination on the bottom surfaces 36, 76 of adapter insert 34 and the adapter housing 32 enables an easier release of these components if there is a buildup of debris behind the wedge ribs 48.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. In a well casing having an underground hollow section with an opening in its wall, an adapter housing secured to said section in registration with said opening and including a top wall, a bottom wall, a pair of side walls, an outer wall having an inner face in communication with a supply pipe and a wedge rib on each of said side walls, and an adapter insert removably mounted in said adapter housing, said adapter insert including a tapered wedge block having a top surface, a bottom surface, an inner surface, and an outer surface in communication with said supply pipe, said tapered wedge block being wedgingly installed between said wedge ribs and said inner face, said adapter insert also including an upwardly projecting socket for receiving a drop pipe to permit installation and removal of said adapter insert and a downwardly depending leg for receiving a flow pipe and pump, the improvement wherein:

the top wall of the adapter housing and the top surface of the adapter insert are inclined at the same angle to prevent shearing of said wedge block against said top wall of said adapter housing when said adapter insert is removed from said adapter housing.

2. The improvement of claim 1, wherein said bottom wall of said adapter housing and said bottom surface of said adapter insert are inclined at the same angle to enable proper seating of said adapter insert relative to said adapter housing, and prevent accumulation of foreign matter rearwardly of said wedge ribs adjacent said bottom wall of said adapter housing.

3. The improvement of claim 2, wherein said uppermost portion of said wedge ribs are tapered to form a guide surface engageable with said inner surface of said wedge block to facilitate installation and removal of said adapter insert relative to said adapter housing.

4. The improvement of claim 1, wherein each of said wedge ribs of said adapter housing is comprised of stainless steel.

5. The improvement of claim 1, wherein said adapter insert is comprised of bronze.

6. A pitless well adapter used in a well casing having an underground section formed with an opening in its wall and equipped with a pump, said well adapter comprising:

an adapter housing secured to said underground section in registration with said opening, said adapter housing including a top wall, a bottom wall, a pair of side walls, an outer wall having an inner face in communication with a supply pipe, and a wedge rib formed on each of said side walls;

an adapter insert slidably and removably mounted in said adapter housing in communication with said supply pipe, said adapter insert including a wedge block having a top surface, a bottom surface, an inner surface, and an outer surface, said wedge block being wedgingly inserted between said wedge ribs and said inner face of said adapter housing, said adapter insert further including a coupling member joined to said wedge block for receiving a flow pipe connected to a pump and for receiving a drop pipe to permit installation and removal of said adapter insert, said flow pipe and said pump, wherein said top wall of said adapter housing and said top surface of said wedge block are formed with matching slopes such that the sliding of said wedge block out of said wedge ribs will enable said adapter insert to deflect away from said adapter housing into said well casing, wherein said bottom wall of said adapter housing and said bottom surface of said wedge block are formed with matching slopes such that the sliding of said wedge block into said wedge ribs will terminate as said bottom wall is engaged by said bottom surface, and wherein an uppermost portion of said wedge ribs are chamfered to form a guide surface engageable with said inner surface of said wedge block as said adapter insert is slidable into position in said adapter housing.

7. The well adapter of claim 6, wherein said coupling member comprises a laterally extending hollow arm in communication with said supply pipe, an upwardly extending socket adapted to receive said drop pipe to facilitate installation and removal of said adapter insert and a downwardly depending leg in communication with said hollow arm for receiving said flow pipe leading to said pump.

* * * * *